(12) United States Patent
Doganata et al.

(10) Patent No.: US 6,772,436 B1
(45) Date of Patent: Aug. 3, 2004

(54) INTERACTIVE AUDIO CONFERENCING SYSTEM

(75) Inventors: Yurdaer Nezihi Doganata, Chestnut Ridge, NY (US); Asser Nasreldin Tantawi, Sommers, NY (US); Ahmed Nasr-El-Din Tantawy, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/144,878

(22) Filed: Sep. 1, 1998

(51) Int. Cl.[7] .............................................. H04N 7/173
(52) U.S. Cl. .................. 725/106; 725/99; 725/100; 725/131; 348/14.09; 379/202.01
(58) Field of Search .................. 725/99, 100, 106, 725/131, 139, 151, 122; 348/14.01, 14.08, 14.09, 14.03, 14.04, 14.1, 14.05; 379/202.01–206.01; 370/260–270

(56) References Cited

U.S. PATENT DOCUMENTS

| | | | |
|---|---|---|---|
| 4,360,827 A | | 11/1982 | Braun |
| 5,675,373 A | | 10/1997 | Joiner et al. |
| 5,742,772 A | * | 4/1998 | Sreenan |
| 5,903,629 A | * | 5/1999 | Campbell, IV et al. |
| 5,990,927 A | * | 11/1999 | Hendricks et al. |
| 6,343,313 B1 | * | 1/2002 | Salesly et al. |
| 6,356,294 B1 | * | 3/2002 | Martin et al. |
| 6,356,945 B1 | * | 3/2002 | Shaw et al. |
| 6,418,214 B1 | * | 7/2002 | Smythe et al. |

* cited by examiner

*Primary Examiner*—Chris Grant
*Assistant Examiner*—Krista Bui
(74) *Attorney, Agent, or Firm*—Scully, Scott, Murphy & Presser; Douglas W. Cameron, Esq.

(57) ABSTRACT

A system enabling television viewers to participate in an audio conference from audio-enabled remote control devices that are equipped with microphones and speakers without requiring the viewer to "dial in" as in a conventional conference call. The system determines the TV channel being watched by the viewer and collects the viewer information that is coming from the remote control device. The user input information is transmitted to an audio conference control center. The information regarding all the viewers interested in participating in an audio conference are collected and processed at an audio conference control center. An operation entity is connected to the audio conference control center for reserving the conference resources provided in an audio bridge device for the viewed TV program channel.

15 Claims, 4 Drawing Sheets

INTERACTIVE AUDIO CONFERENCING SYSTEM

FIELD OF THE INVENTION

The present invention relates generally to interactive applications involving a television broadcast, and more particularly, to a system that enables television viewers to join in an audio conference linked to a program being viewed.

PRIOR ART

The marriage of TV and computing technologies has led to a lot innovative ideas aiming at making the passive TV viewer part of an interactive world of entertainment, information, shopping and other multimedia services. Movies, games on demand, on line shopping, distance learning, are a few of the many exciting applications that are made possible with interactive TV. Cable companies, TV Broadcasters, telephone companies, specialized interactive television companies and many computer companies are all working to provide interactive television.

Currently, there are provided a variety of interactive TV systems. For example, there exists interactive TV systems for video on demand and video gaming. These interactive systems relate to sending and receiving data to set top boxes to enable interactivity with the video distribution systems or a computer system to play games, etc. These systems respond to a request by providing the desired video stream and do not provide for audio interaction with the broadest center and the TV programming. Examples of such systems can be found in prior U.S. Pat. Nos. 5,638,113 and 5,594,491.

There is available, an interactive game system called "Two Way TV" made by Two WAy TV, Limited in the U.K. which allows TV viewers to participate in a game with other viewers by sending data via their desktop box. The service enables viewers to join in TV shows and compete for prizes. There is no audio involved, the viewers participate into the game by sending their responses from a set-top box. The viewer responses are collected remotely and the winner is broadcast from the TV station.

As another example, there exists Interactive TV services to provide audio and video conferencing. These are interactive television services where participants engage in two-way audio and video conferences between a plurality of remote broadcast sides. These conferences are not linked to TV programming and cannot be initiated by the participants. Examples of such systems can be found in prior U.S. Pat. Nos. 5,675,373 and 4,360,827. The functionality enabling the audio conferencing in these prior art systems is obtained by displaying a dial-in-number in which viewers have to dial-in the displayed number to join a conference call.

Still there exist interactive systems that provide communications between a cordless phone and a TV set. Some systems propose a method to display telephony related information on the TV set and to control the TV set by using a cordless phone. The cordless phone is only used to interact with the set top box for data communication as described in U.S. Pat. No. 5,671,267.

There further exists interactive systems that integrate TV systems with Internet applications. These systems allow users to use their TV sets to access the World Wide Web.

The concept of linking audio conferences to television programming is not found in any of these integration efforts.

Thus, it would be highly desirable to provide an apparatus enabling TV viewers to participate in audio conferences that are directly linked to the TV programs that they are watching.

Additionally, it would be highly desirable to provide an apparatus enabling TV viewers to participate in audio conferences that are linked to the programs that they are watching by simply pushing a button on a remote control device resulting in an automatic dial out by an audio bridge.

SUMMARY OF THE INVENTION

It is an object of the invention is to provide an apparatus enabling TV viewers to participate in audio conferences that are directly linked to the TV programs that they are watching.

It is a further object of the invention to provide an apparatus enabling TV viewers to participate in audio conferences that are linked to the programs that they are watching, without the need to dial in to a conference call.

It is another object of the invention to provide an apparatus enabling TV viewers to participate in audio conferences that are linked to the programs that they are watching by simply pushing a button on a remote control device resulting in an automatic dial out to an audio bridge.

It is yet another object of the invention to provide an apparatus enabling TV viewers to participate in audio conferences that are linked to the programs that they are watching, and that, depending on a remote control button being activated, enables switching of their telephone line among different conferences so that viewers can switch from one conference to another without having to dial a second conference call number.

According to the principles of the invention there is provided a system allowing television viewers to participate in an audio conference from audio-enabled remote control devices that are equipped with microphones and speakers without requiring the viewer to "dial in" as in a conventional conference call. The system determines the TV channel being watched by the viewer and collects the viewer information that is coming from the remote control device. The user input information is transmitted to the audio conference control center. The information regarding all the viewers interested in participating in an audio conference are collected and processed at an audio conference control center. The operation and billing centers are connected to the audio conference control center. The operation center reserves the conference resources for the TV program channels through the audio conference control center. The billing information is sent to the billing center at the end of each conference.

Particularly, the TV program broadcasters notify their viewers by displaying a sign on their TV monitors that there is an audio conferencing facility reserved for them. A viewer who watches the program sends a request from a remote control devices to a set-top box and that request is then sent to the audio conference control center. The audio conference control center dials the viewer out and connects viewer's telephone to the conference. The viewer receives the call and automatically joins to the audio conferencing bridge. The coordination between the reserved audio conferences and the TV broadcasting is done by an Operation Center.

Advantageously, the methodology promotes TV viewers to share their opinions or exchange information regarding the program they are currently viewing either among themselves in small private groups or with the TV program host.

BRIEF DESCRIPTION OF THE DRAWINGS

Further features and advantages of the invention will become more readily apparent from a consideration of the following detailed description set forth with reference to the accompanying drawings, which specify and show preferred embodiments of the invention, wherein like elements are designated by identical references throughout the drawings; and in which.

DETAILED DESCRIPTION OF THE INVENTION

The present invention is an apparatus and method that allows users to directly interact with a TV broadcast system by joining an audio conference established for that particular TV broadcast. As opposed to traditional one-way broadcast systems, the invention enables TV viewers to spontaneously be part of a broadcast program to either express their options or provide information over the existing telephony systems.

Figure 1:
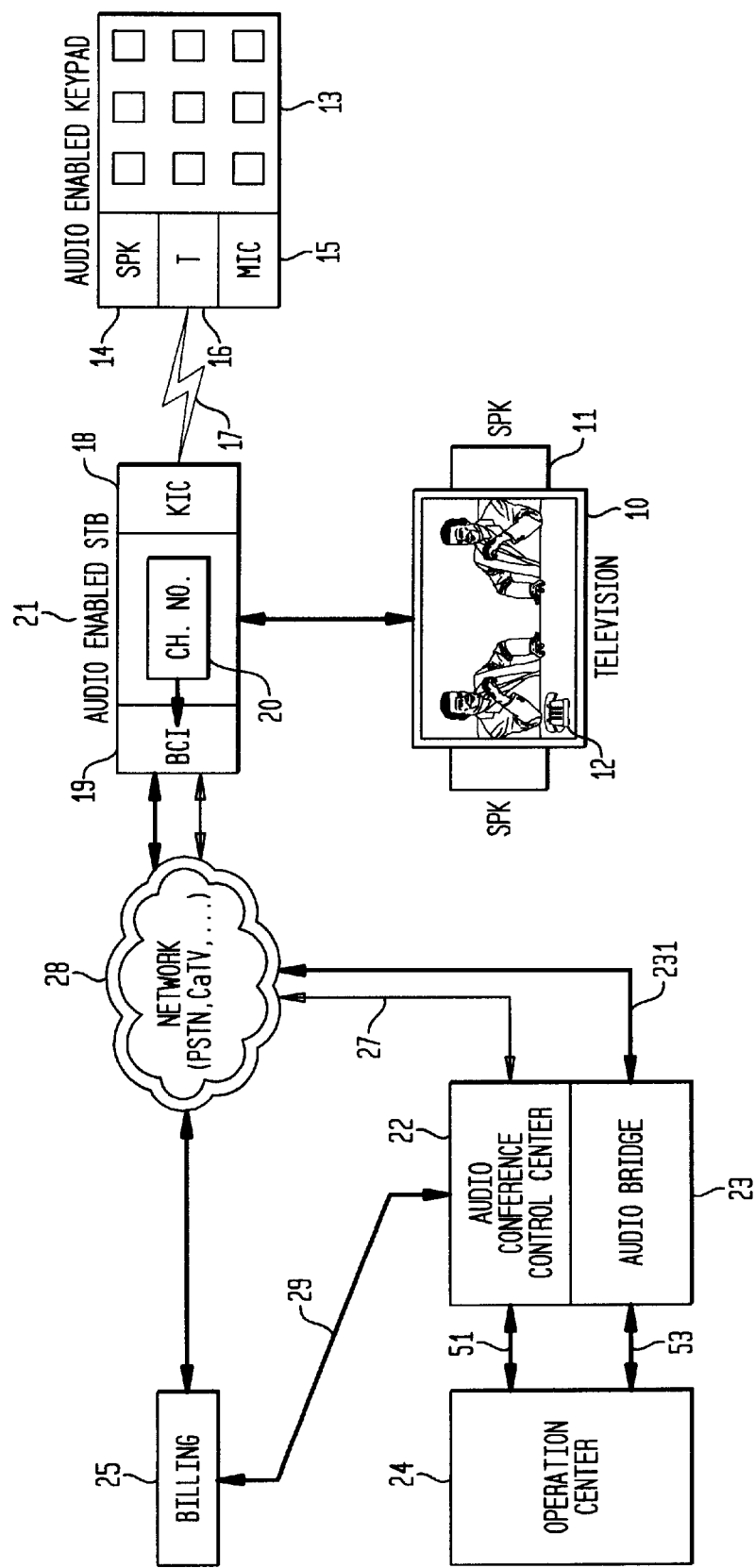
FIG. 1 illustrates the components of the interactive audio conferencing system of the invention.

FIG. 1 illustrates the components of the interactive audio conference enabling system from a TV set. These components include an audio enabled keypad 13, an audio enabled Set Top Box ("STB") 21, a television set monitor ("TV") 10, an audio bridge 23, an audio conference control center ("ACCC") 22, an operation center 24, a billing center 25 and the public switched telephone network ("PSTN") 28.

At predetermined times, when an audio conferencing service is enabled for a particular TV program, the operation center 24 broadcasting that program initiates a broadcast signal including information capable of displaying a conferencing indicator or icon 12, such as the telephone icon sign 12 shown in FIG. 1, on the viewer's TV monitor. Such a telephone icon sign 12 on the TV monitor indicates to the viewer that the audio conferencing service is enabled for that particular TV program at that specific time. Thus, any interested viewer is invited to join in an audio conference.

To join in an audio conference, a viewer enters his telephone numbers using the audio enabled keypad 13 and then pushes a transmit button 16. Once the button 16 is pushed, a signal 17 that contains the telephone number information is transmitted to the audio enabled STB 21 over an infrared wireless connection, for example. The STB 21 includes a front end keypad interface card 18 for receiving and decoding the IR and/or RF signals 17 to and from keypad 13. In the STB, there is provided a process 20 employing logic for identifying the particular broadcast channel number 20 that the viewer is tuned to. Via a back channel interface ("BCI") card 19, shown in FIG. 1 as a component of the STB 21, the telephone number information regarding the identification of the viewer and the TV channel number that the TV is tuned to are both sent to the audio conference control center 22. In the preferred embodiment, the telephone number and the TV channel number information are communicated to the ACCC 22 via a conductor 27 connected with the data network, e.g., the PSTN 28. Alternately, the TV viewer and TV channel information may be transmitted to the audio conference control center 22 via a cable 27.

In the preferred embodiment, the audio conference control center 22 controls the audio bridge 23 and the connections to it by sending an audio control request, to the audio bridge which, in response, dials each viewer out and connects the viewer to the audio bridge corresponding to the selected TV program, via line 53. The operation center 24 reserves an audio bridge resource for all the channels that are inviting viewers to join an audio conference and receives back conference identification signals corresponding to each channel that is reserving a conference. The conference identification information for each channel is passed between the audio conference control center 22 and the operation center 24 via command line 51, thus enabling the audio conference control center to associate the channel numbers with conference identifiers. Additionally, the host (s) of the TV program can be connected to the audio conference from their TV studio.

Figure 2:
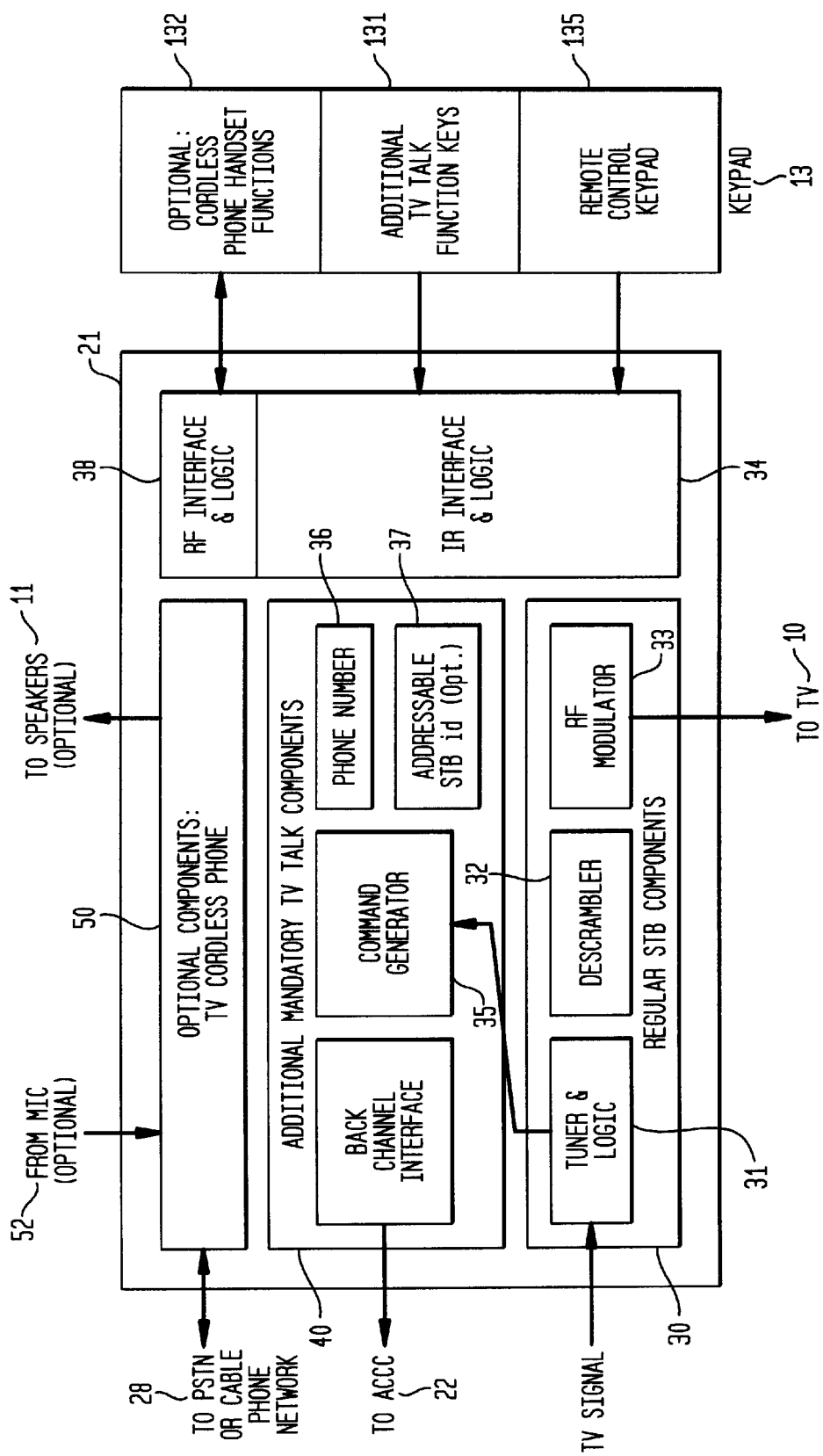
FIG. 2 illustrates the components of the audio enabled STB 21 provided in the interactive audio conferencing system of the invention.

FIG. 2 illustrates the components of the audio enabled STB 21. The audio enabled STB 21 is made up of three sets of components: 1) those STB components 30 providing the standard STB functionality, including: a signal tuner element and its associated logic 31, a descrambler 32, an RF modulator component 33, which translates the TV broadcast signals and transmits them to the TV set 10, and, an IR interface unit 34 for receiving and decoding signals from the audio enabled keypad device 13; 2) those components 40 needed to provide the audio conferencing service described herein; and, 3) optional components 50 making the implementation of the audio conferencing service simpler.

The components 40 enabling the audio conferencing functionality of the invention include: a call-back identifier phone number register 36 and an STB identification register 37 for addressable STBs; a command generator 35, which invokes digital logic for extracting the tuned in channel number from the STB 31 and generating a command that includes the request to join and the call back identifier phone number or STB id; and, the back channel interface 19, which could be a telephony (PSTN) interface or cable modem or an equivalent communication device capable of receiving/transmitting communications from/to the audio conference control center 22. Particularly, when the viewer pushes the appropriate button on the remote control, a call back request signal is sent to the audio conference control center. The request signal contains a call back identifier phone number and the tuned in channel number.

When the audio conference control center receives the request, the call back phone number is dialed-out and it is connected to the conference resource that is associated with the tuned in channel number.

As shown in FIG. 2, the remote control keypad 13 comprises three sets of components: 1) the keypad component 135 providing the standard remote control functionality; 2) additional function keys 131 for implementing the audio conferencing features described herein; and, 3) optional components 132 implementing a cordless phone handset for integration in the keypad 13. Thus, the optional components 50 of the audio enabled STB include components that are equivalent to a cordless phone base 50 including: associated RF interface and logic 38 that could use the optional cordless phone handset component 132 in the enhanced Key pad 13. The output of the phone can also be routed to the TV speakers 11 and the input can be obtained through an external microphone 52.

Figure 3:
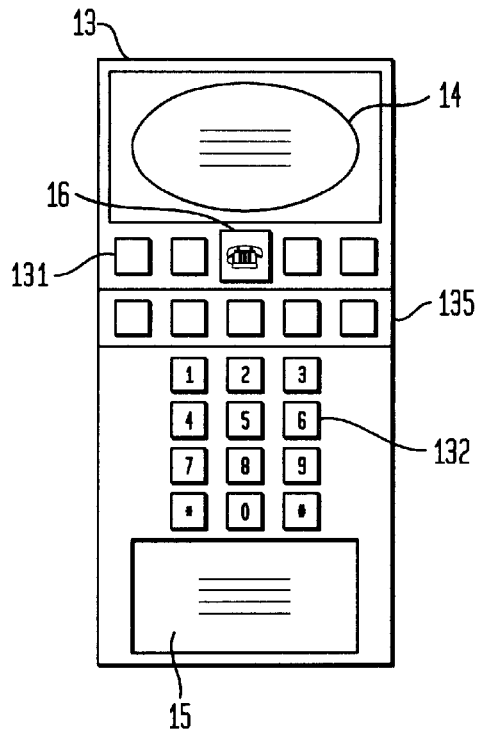
FIG. 3 illustrates the enhanced audio enabled keypad 13 enabling direct audio conferencing of the invention.

FIG. 3 illustrates the audio enabled keypad 13 which, in the preferred embodiment, is functionally equivalent to a wireless phone with remote control capabilities. The telephony components of the audio enabled keypad 13 include microphone 15, speaker 14 and the dial-up buttons 132. The enhanced feature of the audio enabled keypad 13 is the provision of a "join conference" button 16, which, when selected, passes the viewer's telephone number information to the audio-enabled STB over the wireless connection 17 (FIG. 2). Additionally provided are TV talk function keys 131, 135 for sending information to IR interface unit 34. By using these additional TV Talk Function keys the phone number of the user can also be registered to the STB phone number register 36 over the IR interface.

Figure 4:
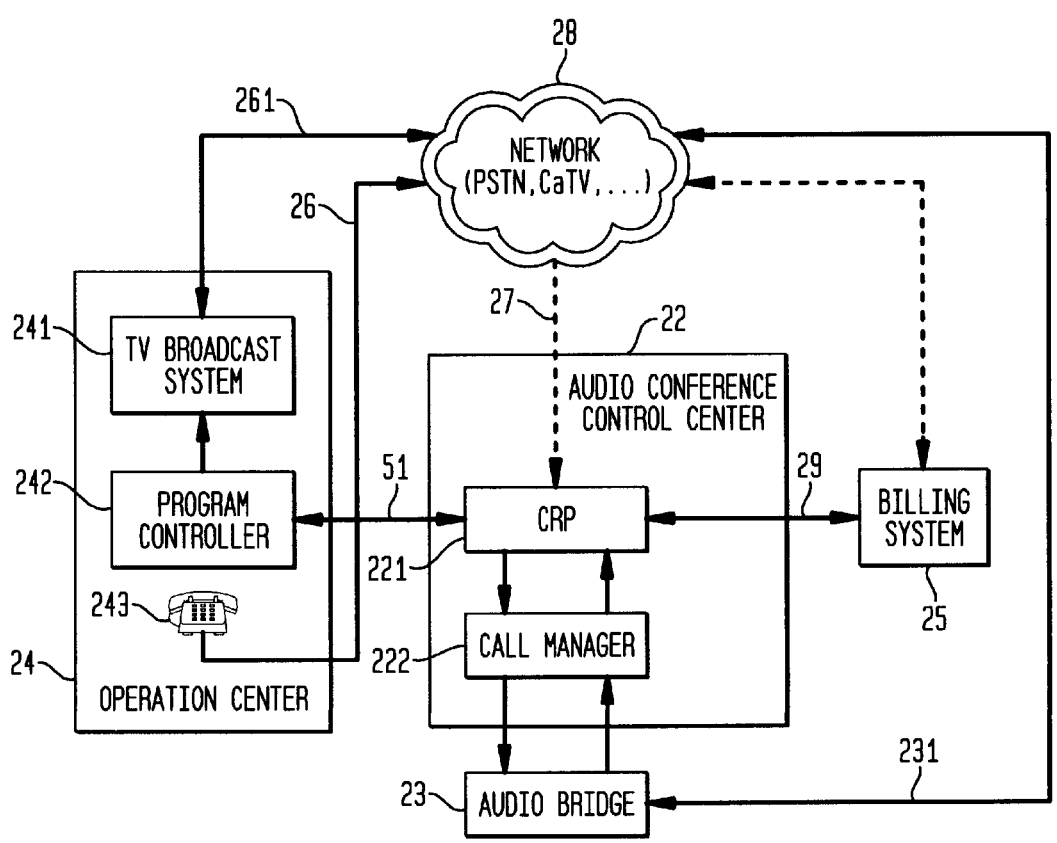
FIG. 4 is a logical block diagram depicting the manner in which audio conferencing is established according to the invention.

As shown in the detailed diagram of FIG. 4, the audio conference control center 22 comprises two components: a Conference Request Processor ("CRP") 221, and, an audio bridge Call Manager 222. The CRP 221 receives requests from two sources: viewers via data line 27 and the program controller 242 at the operation center 24 via line 51. The types of audio control requests received from the viewer is a request to add or drop that viewer to/from the conference for the particular television show enabling the audio conferencing feature. Types of audio control requests received from the program controller 242 include: a request to reserve/terminate a conference; a request to open/close conference; a request to obtain a conference status; and a request to transmit a participant's status to the call manager. For example, conference status information requested by a program controller 242 may include: how many ports are reserved for a particular conference; how many ports are currently being used for a particular conference; who are the current participants, e.g., what are the participants originating phone numbers, and at what time did the conference start and end. Party status information may include similar information related to a participant, e.g., the time when participant connected/disconnected from the audio bridge, what port on the bridge did the user utilize, and what the party's originating phone number was. Such information, for example, may eventually be utilized by the billing system 25 in order to properly bill the subscriber.

In response to these audio control requests the CRP 221 forwards audio control responses including: any type of request acknowledgment, i.e., affirmative or negative; a conference status, a party status and, a billing record for the billing system 25. The status of each call and billing information may be sent directly to the billing system 25 through the CRP 221 via conductor 29. Particularly, the billing system 25 records the duration of each call in a billing database (not shown).

Figure 5:
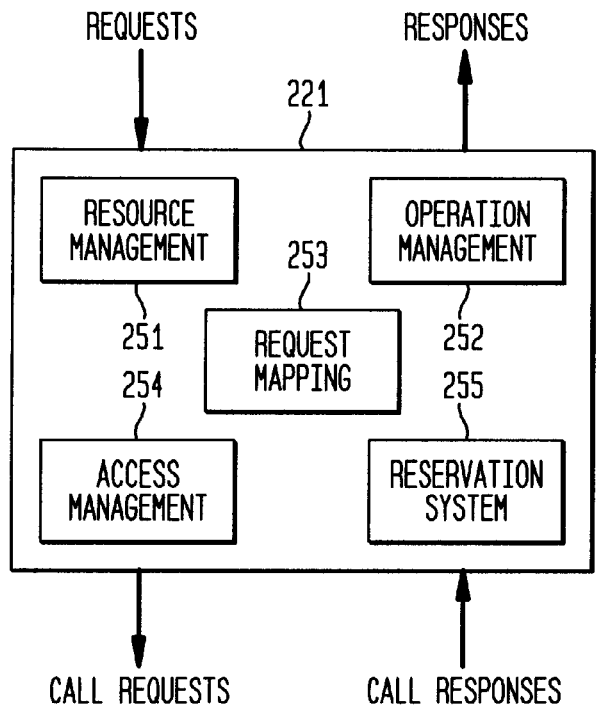
FIG. 5 is a block diagram illustrating the main operational components comprising the conference request processor.

With more particularity, FIG. 5 illustrates the software architecture of the conference request processor 221. As shown in FIG. 5, there is provided the following processes: a resource management process 251 that is responsible for managing the routing of calls to the appropriate call manager component and that ensures resources such as conference and ports are available to accommodate the requested call; an operation management process 252 that is responsible for managing the operation of audio conferences and perform general system management functions, e.g., knowing which system resources, e.g., call managers, are up and running and which are down. In this manner, the resource management component 251 will be able to route calls appropriately; a request mapping process 253 for translating (mapping) audio control requests/responses from viewers and the program controller to/from call requests/responses; an access manager process 254 which is responsible for ensuring that viewers have access privileges to use the call conferencing service; and a reservation system 255 for managing the reservation of conferences ahead of time.

Figure 6:
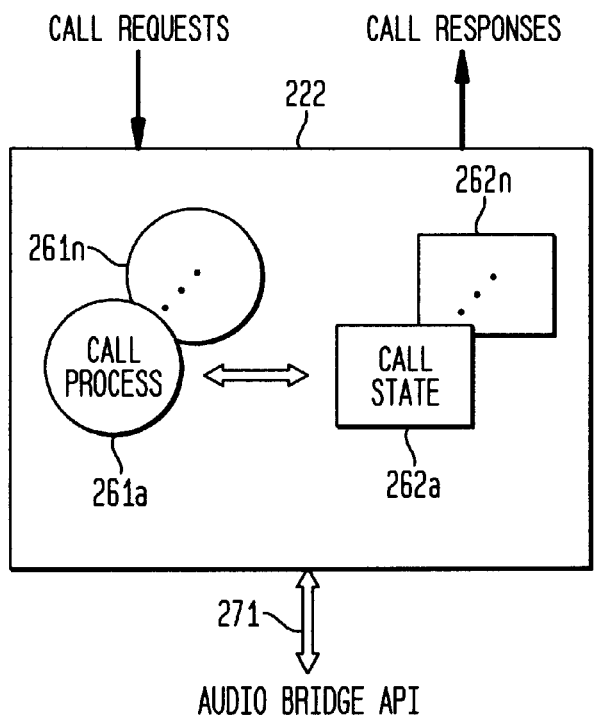
FIG. 6 illustrates the components of the audio bridge call manager component.

As shown in FIGS. 5 and 6, each of these processes communicate with the call manager 222 which is a software program including processes for translating call requests from the CRP 221 into audio bridge control commands and sending them to the audio bridge 23. The CRP 221 particularly forwards call requests to the call manager including, but not limited to: a request to start/end a conference; a request to dial/hangup participant; add/drop participant to/from the conference; get conference status; and, get party status.

As shown in FIG. 6, the call manager component is a program comprising one or more call processes 261a, . . . , 261n, each for managing a different conference being routed through the audio bridge 23 via an audio bridge specific API. Particularly, each call process handles call requests received from the CRP 221. Via the audio bridge specific API 271, each call process 261a, . . . , 261n sends corresponding requests to the audio bridge 23 and receives conference and party status information from the audio bridge. The call manager process then transmits call responses back to the conference request processor 221 as audio control responses. In the preferred embodiment, for each call process, there is a corresponding call state 262a, . . . , 262n comprising a representation of the state of that conference and the parties associated with that conference. Each call process 261a, . . . , 261n handling a specific call request updates its respective call state 262a, . . . , 262n which may be a separate database file or data contained within the call process itself. Specific responses that are forwarded back to the CRP 222 in response to call requests include: request acknowledgments, e.g., affirmative/negative; conference status; and party status.

Referring back to FIG. 4, the audio bridge 23 is physically connected to the PSTN 28 via conductor 231, which may be a T1 line, similar to the manner in which most audio bridges in North America are connected to PSTN and central offices. The viewers are called out via this line 231 and once the calls are connected successfully the connections are bridged at 23. It should be understood that bridge requests and responses are specific to the audio bridge being utilized. Different bridges are contemplated for use in the invention, depending upon the volume of conferences and/or calls expected, and/or geographic area served by the bridge. Commercially available audio bridges suitable for implementation in the instant invention include those manufactured by: Dialogic, Siemens, AT&T, etc. An audio bridge contemplated for use in the invention and manufactured by the assignee, is the IBM CallPath.

FIG. 4 is an illustration depicting the manner in which audio conferencing is established. First, the signal 27 containing the channel number and viewer's telephone number information is sent to the audio conference control center 22 where it is received by the Conference Request Processor 221. As described, a signal 27 transmitted in response to selection of the remote control button, is a request to dial the viewer's telephone number out, the broadcast channel identifier, and a request to add the connection to the audio conference bridge being reserved for the conference. The CRP 221 receives these requests, i.e., exchanges messages between the data network 28 and the audio bridge Call Manager 222. Particularly, the access manager process (FIG. 5) within the CRP 221 is invoked to ensure that the requesting participant is entitled to participate in the conference, i.e., is a subscriber to the service. The resource manager component may also be invoked to determine which call manager component and audio bridge are enabled for receiving the calls. If it is a new conference, the audio bridge, in turn, reserves conference resources, and adds participants to the bridge, and drops participants when the call is completed. If it is a conference that has already been established, the conference may be checked by first issuing a conference status request so as to ascertain, e.g., how many people are already participating. Such conference status information may be used to determine if resources are available to accommodate other requesting subscribers in the particular conference. The Call Manager 222 receives the call status information in response to a request 51 that comes from the Program Controller 242 via CRP 221. The status information contains the list of active and reserved conferences, their start and end time and durations. The status information is then sent back to the Program Controller 242 via CRP 241 and 51. The Program Controller then passes this information to TV Broadcast System 241 which directly controls the content of the program to be broadcast. The status information is integrated into the TV program broadcast at the TV Broadcast System 241. As a result of this integration, the viewers receive an icon sign 12 as shown in FIG. 1 which is an indication of an active conference.

It should be understood that as there are possibly many audio conferences associated with different TV channels, the viewers can only know which audio conferences are active by switching TV channels and looking for a sign as an indication that an audio conference is active for the channel they just switched to. Thus they may join into an active conference by pushing the appropriate button on their remote control in the manner described. After joining into an audio conference, a viewer may switch to a different TV channel. Switching to a different TV channel does not automatically disconnect the viewer from the audio conference that the viewer is participating. However, when the TV channel is switched to another channel associated with an active conference, the viewer may choose to switch to other conference by just pushing the same button on the remote control device.

While the invention has been particularly shown and described with respect to illustrative and preformed embodiments thereof, it will be understood by those skilled in the art that the foregoing and other changes in form and details may be made therein without departing from the spirit and scope of the invention which should be limited only by the scope of the appended claims.

Having thus described our invention, what we claim as new, and desire to secure by Letters Patent is:

1. A system for providing an audio conference service enabling one or more uses to participate in an audio conference linked to a television broadcast being viewed by said one or more uses comprising:

means for communicating to said viewers an invitation to join said audio conference linked to said television broadcast, said invitation integrated with said broadcast currently being viewed;

an audio bridge device associated with a broadcast entity and having resources for enabling multi-party audio conferencing relating to said broadcast;

an audio enabled remote control keypad device for generating a first signal requesting user participation in said audio conference, said first signal requesting user participation being received by a user set top box associated with a user television device currently receiving said broadcast;

a first control means included in said set top box and responsive to said first signal for generating a second signal having a user number and viewing channel information linked to said broadcast, said second signal capable of being transmitted over a public switched telephone network;

second control means for receiving said second signal and reserving said audio bridge resources for accommodating user requests to join said audio conference, said second control means further establishing an audio connection between said audio enabled remote control keypad of a user and said audio bridge via that user's set top box in response to said user number and viewing channel information, whereby each one or more viewers may establish an audio connection between an audio-enabled remote control keypad and the audio bridge via a respective user set top box to participate in said audio conference without dialing in to said audio bridge via a telephone connection.

2. The system as claimed in claim 1, wherein said audio enabled remote control keypad device includes means for receiving number information associated with said user, and integrated audio signal receiving and transmitting means for enabling viewers to participate in said established audio conference.

3. The system as claimed in claim 1, wherein said audio enabled remote control keypad device for initiating user participation requires selection of a single pust-button.

4. The system as claimed in claim 1, wherein said first control means includes a set-top box linked to a TV monitor, said set top box generating said viewing channel information for said second signal.

5. The system as claimed in claim 4, wherein said user number information is manually entered into said set top box.

6. The system as claimed in claim 4, wherein said user number information is stored in said set top box.

7. The system as claimed in claim 1, wherein said second control means further includes means for translating said second signal into commands capable of configuring said audio bridge device for dialing said requesting viewers.

8. The system as claimed in claim 1, wherein said second control means includes a resource manager means in communication with said audio bridge device for tracking resources available in said audio bridge device relating to said broadcast.

9. The system as claimed in claim 1, further including an operation means associated with said broadcast entity for generating a third signal enabling reservation of audio bridge resources for said broadcast prior to generating said invitation.

10. A method for enabling one or more users to participate in an audio conference linked to a television broadcast being viewed by said one or more users comprising:

communicating an invitation to said viewers to join said audio conference linked to said television broadcast, said invitation integrated with a broadcast curtly being viewed;

establishing audio bridge resources for enabling multi-party audio conferences relating to said broadcast, said resources provided in an audio bridge device associated with a broadcast entity;

providing a user with an audio enabled remote control keypad device for generating a first signal requesting user participation in said audio conference, said first signal requesting user participation being received by a user set top box associated with a user television device currently receiving said broadcast;

responding to said first signal in said user set top box by generating a second signal having a user number and viewing channel information linked to said broadcast;

transmitting said second signal over a public switched telephone network;

reserving said audio bridge resources in response to said second signal generated via said user set top box; and, establishing an audio connection between said audio enabled remote control keypad of a user and said audio bridge device via that user's set top box in response to said user number and viewing channel information contained in said second signal, whereby each one or more viewers may establish an audio connection between an audio-enabled remote control keypad and said audio bridge via a respective user set top box to participate in said audio conference without dialing in to said audio bridge via a telephone connection.

11. The method as claimed in claim 10, further including the step of manually entering said user number information in said audio enabled remote control keypad device associated with said user.

12. The method as claimed in claim 11, wherein said audio enabled remote control keypad device for generating said first signal includes selecting a single push-button.

13. The method as claimed in claim 10, wherein said step of reserving said audio bridge resources includes the step of translating said second signal into commands capable of configuring said audio bridge device for dialing said requesting viewers.

14. The method as claimed in claim 10, further including the step of tracking resources available in said audio bridge device relating to said broadcast.

15. The method as claimed in claim 10, further including the step of generating a third signal to enable reservation of audio bridge resources for said broadcast prior to generating said invitation.

* * * * *